United States Patent [19]

Thompson et al.

[11] Patent Number: 5,433,758
[45] Date of Patent: Jul. 18, 1995

[54] APPARATUS AND METHOD FOR CONTROLLING WEEDS AND UNDERGROWTH USING LIQUID SPRAY AND FOAM

[76] Inventors: James E. Thompson, 1000-E Hoover Rd., Winter Haven, Fla. 33884; A. H. J. Rajamannan, 2120 Argonne Dr., Minneapolis, Minn. 55421

[21] Appl. No.: 126,261

[22] Filed: Sep. 24, 1993

Related U.S. Application Data

[62] Division of Ser. No. 935,865, Aug. 26, 1992, Pat. No. 5,297,739.

[51] Int. Cl.⁶ .............................................. A01G 13/00
[52] U.S. Cl. .................................... 47/58; 47/2; 47/1.44; 43/130; 43/132.1
[58] Field of Search ................ 43/144, 130, 132.1; 47/1 N, 2 CC B, 1.5, 1.7, 58.01, 1.44

[56] References Cited

U.S. PATENT DOCUMENTS

| | | | |
|---|---|---|---|
| 3,563,461 | 2/1971 | Cole | 47/2 CC B |
| 5,052,618 | 10/1991 | Carlon | 47/2 |
| 5,251,398 | 10/1993 | Balassa | 47/2 CC B |

OTHER PUBLICATIONS

Foam that Kills Weeds by Charles E. Ball Farm Journal Nov. 1968, p. 26, vol. 92 #11.

*Primary Examiner*—Henry E. Raduazo
*Attorney, Agent, or Firm*—Pettis & McDonald

[57] ABSTRACT

A method for controlling weeds and undergrowth and for treating plants in agricultural settings is disclosed. The method is characterized by first applying a spray of hot water to the plant, and then applying a foam blanket to the sprayed plants, whereby heat from the hot water spray is held against the plants.

1 Claim, 4 Drawing Sheets

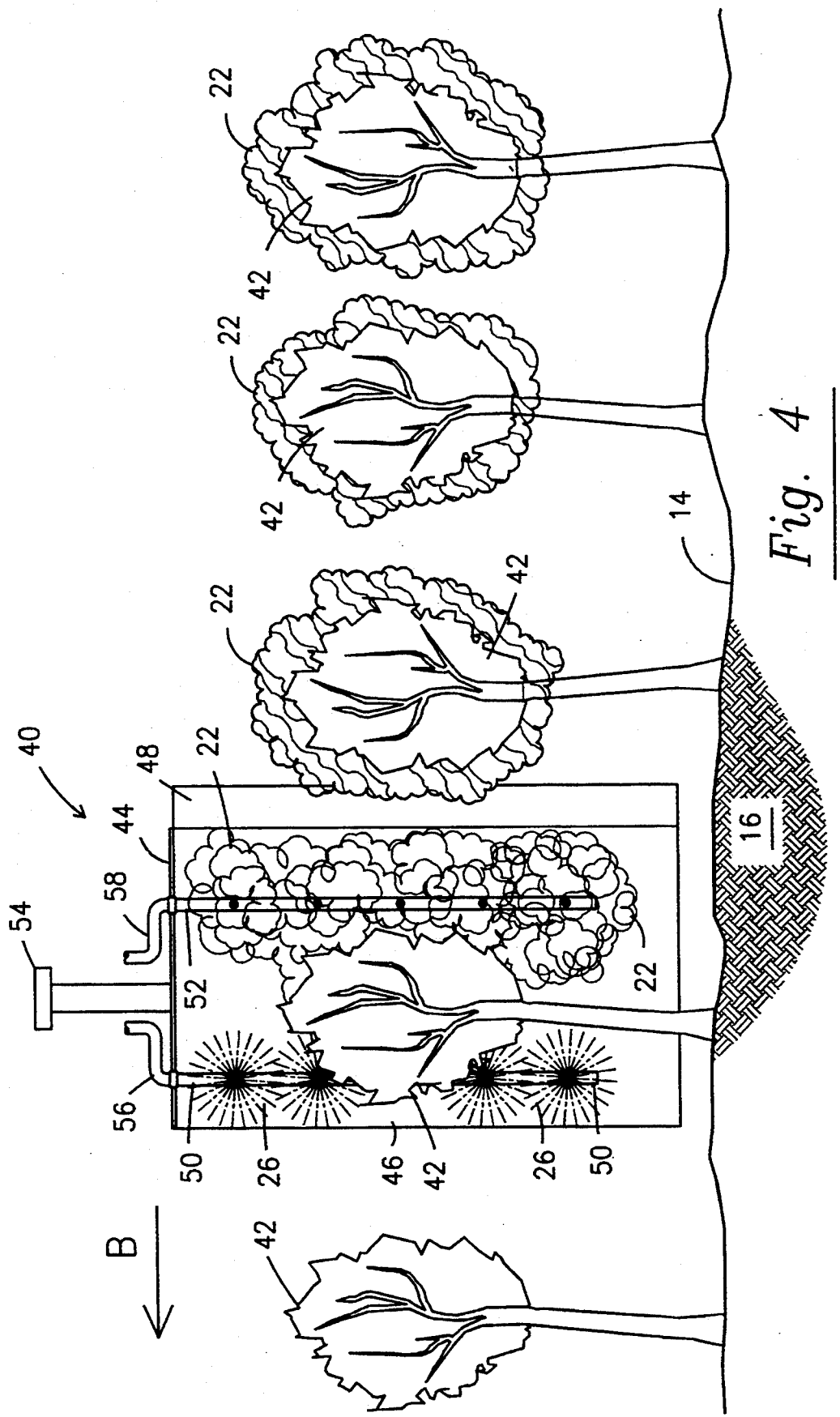

APPARATUS AND METHOD FOR CONTROLLING WEEDS AND UNDERGROWTH USING LIQUID SPRAY AND FOAM

RELATED APPLICATION

This is a continuation-in-part application of Ser. No. 07/935,865, filed Aug. 26, 1992, now U.S. Pat. No. 5,297,730, issued Mar. 29, 1994.

BACKGROUND OF THE INVENTION

1. Field of the Invention

The present invention relates to both a method for controlling weeds and undergrowth in agricultural and industrial settings. The invention utilizes a spray of heated water for controlling the undesirable substances, and is particularly characterized by its application of a foam blanket downstream of the hot water spray, which serves to insulate the heated spray from ambient conditions, thereby increasing the efficacy of the spray in controlling undesirable weeds and undergrowth.

A first boom with nozzle openings, or a multitude of nozzles or openings, sprays hot water. Behind this first boom is a second boom that sprays a foam made up of various materials such as foam surfactant, polymers or oil emulsions so that the grass or weeds or vegetation that received the heated water does not cool off rapidly after being sprayed.

The foam, consisting of micro and macro bubbles, gives transient insulation characteristics similar to a flexible or stiff insulating canopy, as taught in U.S. Pat. No. 5,297,730.

This foam can be applied on weeds on the ground and also on standing row crops such as cotton for defoliation using hot water, or grape vines or other vines post pruning to heat kill dry fungus, bacteria or virus attached to the bark of these vines or living on the bark or stems of such vines.

2. Description of the Prior Art

Within the agricultural industry, various methods are known and recognized as being effective for controlling the growth of weeds and other undesirable substances. Many such methods involve the application of aqueous solutions of treatment chemicals onto the undesirable substances. Over the past years, as we have become more aware of our environment and the delicate balances that must be maintained in order to preserve a healthy environment, much care and concern have arisen over the utilization of toxic chemicals for weed and undergrowth control as well as for insect control. One merely has to read the labels of numerous commercially-available insecticides and herbicides to appreciate the caution which must be exercised in their proper use.

Utilization of herbicides and insecticides not only subjects the user to personal danger, but also may damage desirable crops if the treatment materials are not applied properly. Furthermore, accumulations of treatment materials in the soil and in water sources are now recognized as further dangers to the environmental balance.

In recognition of the dangers attendant to the use of herbicides and pesticides, manufacturers of such products maintain elaborate and expensive testing facilities. Both local and national governments also expend large sums of money and resources for the purpose of determining and monitoring safe and effective dose rates for such chemicals. In fact, most efforts for making the use of herbicides and insecticides safer to our environment involve efforts to formulate "safer" chemicals.

Nevertheless, prior patent literature does disclose at least one apparatus for eliminating undesirable vegetation growth which is relatively safe to the environment. U.S. Pat. No. 213,255 to Simpson discloses an apparatus which uses steam and/or hot water to kill vegetation on railroad beds. According to the disclosure of that patent, the application of steam and/or hot water provided by the steam locomotive engine is efficacious for killing vegetation which might seek to grow along the tracks and railway beds.

Other prior art devices such as, for example, U.S. Pat. No. 3,242,098, to Andrews, are also known in the prior art. However, the Andrews patent discloses an apparatus for generating a vapor or fog for purposes of concealment, for controlling atmospheric temperature, for disseminating insecticide or other materials into the outside atmosphere or into confined spaces, etc. A vehicle-mounted spray apparatus is disclosed in U.S. Pat. No. 4,817,870, to Dalton. However, the device of the Dalton patent is primarily concerned with spraying materials onto a road or highway. U.S. Pat. No. 3,986,670, to Syveson discloses a hand held thermal electric fogging device for dispensing a fog, or cloud, of insecticide. Other similar devices are also known in the art, and virtually all such devices that involve heating the material before spraying apply sufficient heat and pressure so that the material is dispensed as a fog. It is clear that the use of such vapors or fogs would be quite inefficient in that they would clearly be subject to drift onto plants which should not be treated and to significant dispersion into the atmosphere because of the gas-like nature of the fog. Furthermore, if active ingredient chemicals are included in such fogged sprays, hazardous conditions for both the operator and the surrounding environment may be created because of the wide dispersion of the fogged material.

It is, therefore, clear that there is a great need in the art for a new apparatus and method for controlling undesirable vegetation growth and insect infestation in a manner which would not result in the addition of new and increased levels of chemical poisons to our environment.

SUMMARY OF THE INVENTION

The present invention is an improvement over our earlier inventions for controlling weeds and undergrowth, as disclosed in U.S. Pat. Nos. 5,297,730 and 5,366,154.

In this improvement, we are using a foaming material to provide insulation to the weeds, plants or vines to keep the heat that was applied by a hot water spray to the plants from dissipating too rapidly. In other words, this foam becomes a supplement and/or substitute for a mechanical insulation method as provided by our earlier invention of U.S. Pat. No. 5,297,730.

In addition, the foam insulator makes holding the heat to the plant easier in particular situations like cotton plants or grape vines where a mechanical canopy is virtually impossible.

The invention accordingly comprises the several steps and the relation of one or more of such steps with respect to each of the others thereof, which will be exemplified in the method hereinafter disclosed, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which:

FIG. 4 is a sectional elevation of the second apparatus shown in FIG. 3.

Similar reference characters refer to similar parts throughout the several views of the drawings.

DETAILED DESCRIPTION

Figure 1:
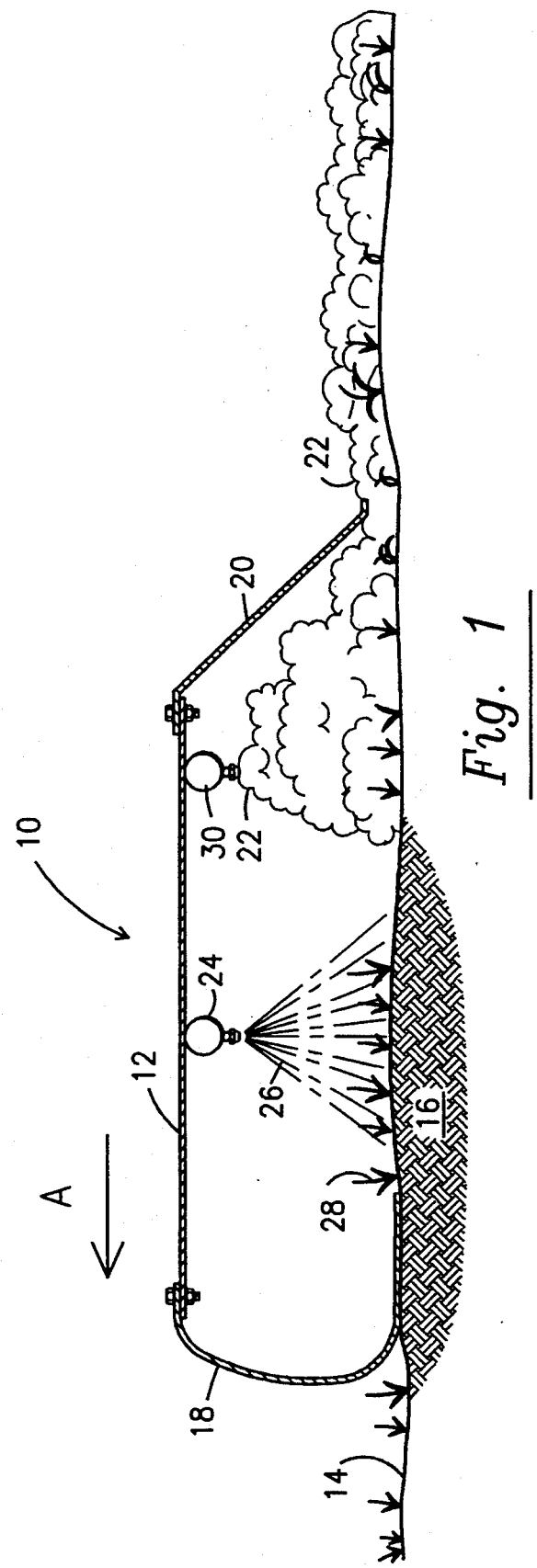
FIG. 1 is a sectional elevation of the spray boom portion of an apparatus suitable for practicing the method of this invention.

Even though this invention is best described and claimed as a method for controlling weeds and undergrowth, inasmuch as it comprises a method including the steps of applying a spray of heated water to the plant and then applying a foam blanket thereover to serve as a heat-retaining insulation barrier, we believe that the invention can best be understood by reference to a pair of alternate embodiments for apparatus to apply the hot water spray and the foam blanket. Accordingly, our description of the method of this invention will be given with regard to such alternative embodiments as illustrated in the drawing figures. It is also to be understood that the apparatus shown rather schematically in the drawing figures is intended to be used in combination with a source of hot water and a source of foaming agent. Such a device could be, for example, generally as illustrated in U.S. Pat. No. 5,297,730.

Figure 2:
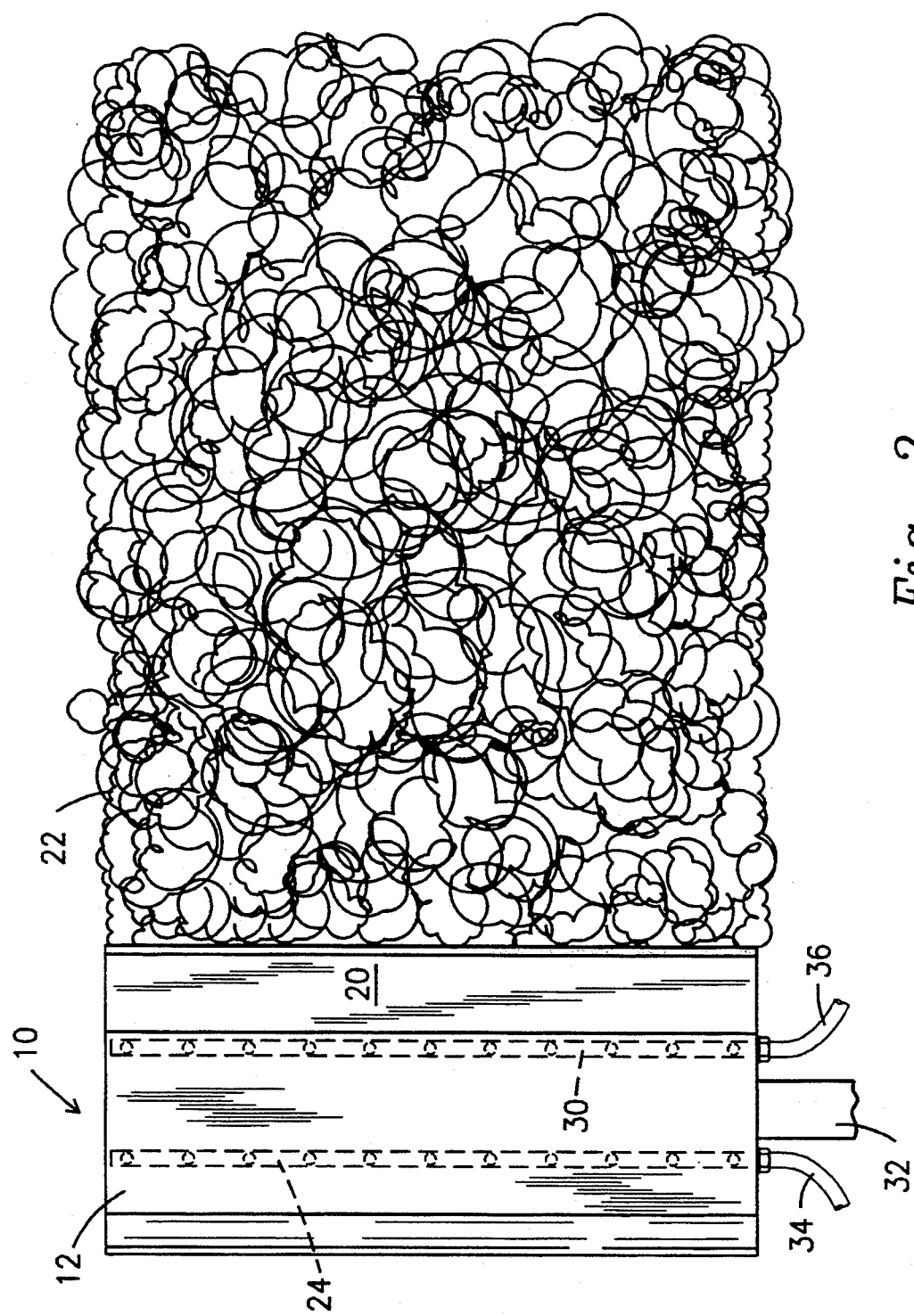
FIG. 2 is a top, plan view of the apparatus shown in FIG. 1.

Referring to the views of FIGS. 1 and 2, a first embodiment of the spray boom is generally indicated as 10. Spray boom 10 comprises a cover 12 which is transportable over the surface 14 of the ground 16. As shown in FIG. 1, the direction of travel is indicated by arrow A.

A forward flange 18 extends downwardly from the leading edge of cover 12 and curves rearwardly to engage surface 14. Accordingly, forward flange 18 is preferably formed from a resilient material. Depending from the trailing edge of cover 12 is a rear flange 20, which also serves to spread foam 22 as more fully described hereinafter.

Hot water spray means 24 is disposed on the bottom of cover 12 between forward flange 18 and rear flange 20. Hot water spray means 24 may comprise a plurality of spray tips whereby hot water 26 is sprayed onto surface 14, and, thus, into intimate contact with plants 28.

Foam spray means 30 is also mounted on the bottom of cover 12 intermediate hot water spray means 24 and rear flange 20. Foam spray means 30 may comprise a plurality of spray apertures whereby foam 22 is deposited on top of plants 28 which have just received a spray of hot water 26.

As device 10 traverses surface 14 in the direction of arrow A, rear flange 20 serves to spread, or distribute, foam 22 across plants 28, thereby retaining the heat from hot water 26 in intimate contact with the surfaces of plants 28.

Referring to the top view of FIG. 2, it is to be seen and understood that this first embodiment of spray boom 10 is attached to and moved by a transport vehicle (not shown) as by first attaching arm 32. Hot water 26 is provided to the hot water spray means 24 as by water conduit 34. Finally, foaming agent is provided to foam spray means 30 through foam conduit 36. It is also to be understood that foam 22 may be derived utilizing well known procedures and apparatus from various materials such as, for example, foaming surfactants, polymers, oil emulsions, and mixtures thereof.

Figure 3:
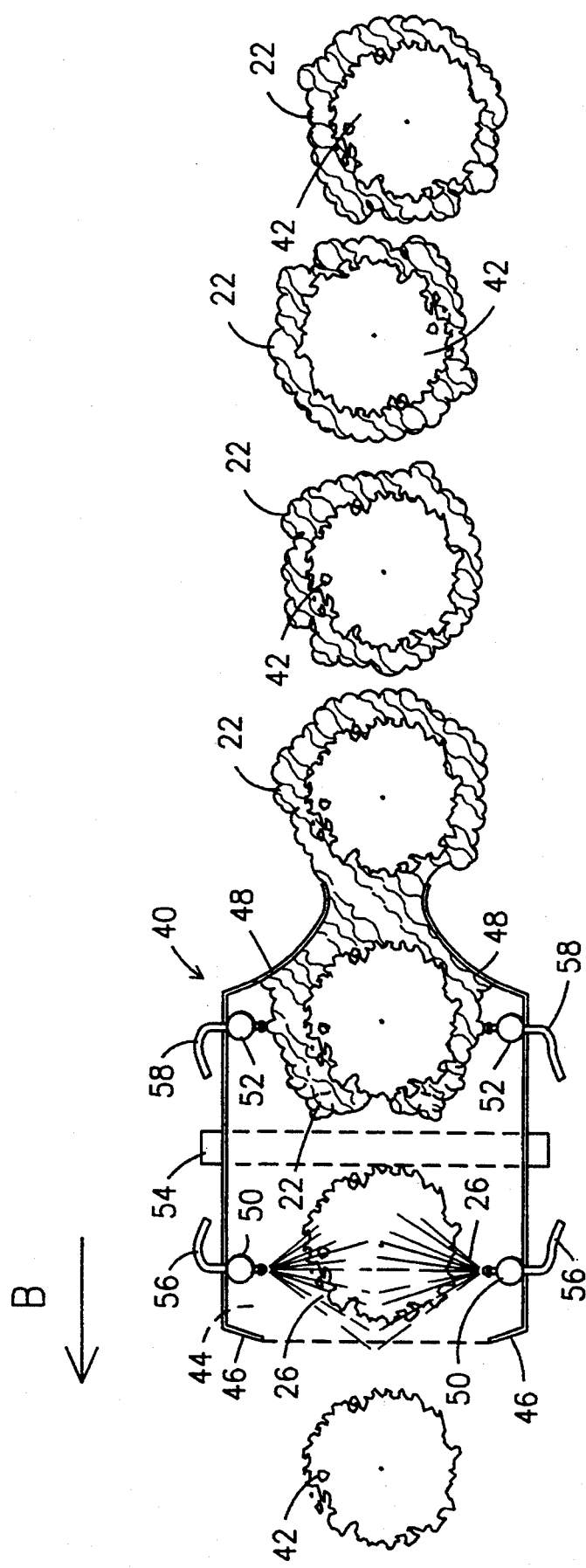
FIG. 3 is a top, plan view of the spray boom portion of an alternative apparatus for practicing the method of this invention.

Turning now to the view of FIG. 3, a second embodiment of the spray boom is generally indicated as 40. Second embodiment 40 is particularly useful when defoliating plants, such as cotton plants, before harvesting the cotton, or as when treating grape vines after pruning to heat kill dry fungus, bacteria, or virus attached to the bark of those vines or living on the bark or stems of such vines. Accordingly, while the method is virtually identical, second embodiment 40 permits the application of hot water 26 around all sides of the second plant 42, and, likewise, a substantially surrounding blanket of foam 22 following the spray application of hot water 26.

Second embodiment of spray boom 40 is operatively connected to a means for moving the device across surface 14 of ground 16 in the direction of arrow B, and to a source of both water and foam material. As already described above, such means for moving and sources for water and foam material may be provided by, for example, the tractor/trailer combination shown in U.S. Pat. No. 5,297,730, or any other suitable means.

Considering both FIGS. 3 and 4, second embodiment 40 comprises a second cover 44, a pair of forward flanges 46 extending forwardly therefrom, and a pair of rear flanges 48 extending rearwardly therefrom. Operatively mounted beneath second cover 44 are a pair of second hot water spray means 50 for depositing a spray of hot water 26 on second plants 42. Second hot water spray means 50 are mounted on opposite sides of second cover 44 rearwardly of corresponding forward flanges 46.

Also disposed beneath second cover 44 are a pair of second foam spray means 30, which are behind second hot water spray means 50, but in front of rear flanges 48. The device of second embodiment 40 is attached to the means for transporting (not shown) as by second attaching arm 54. Hot water 26 is supplied to each of the second hot water spray means 50 by second water conduit 56, and foam material is supplied to each of the second foam spray means 52 as by second foam conduit 58.

By virtue of this construction, it can be seen that a spray of hot water 26 is applied in substantially surrounding relation to virtually all surfaces of second plant 42. Then, immediately thereafter, an insulating foam blanket is applied through second foam spray means 52. It is also to be noted that rear flanges 48 serve effectively to compress the foam 22 in surrounding relation to each of the second plants 42. As such, rear flanges 48 are preferably formed from a resilient material.

It will thus be seen that the objects set forth above, among those made apparent from the preceding description, are efficiently attained and, since certain changes may be made in carrying out the above method without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A method for controlling weeds and undergrowth and for treating plants, said method comprising the steps of:
   a. applying a spray of heated water to the plant; and
   b. applying a foam blanket to the sprayed plants, whereby heat from said spray is held against the plants.

* * * * *